Sept. 6, 1938.  A. HALL ET AL  2,128,938
LOCK WASHER
Filed Jan. 30, 1937
*Fig. 1.*
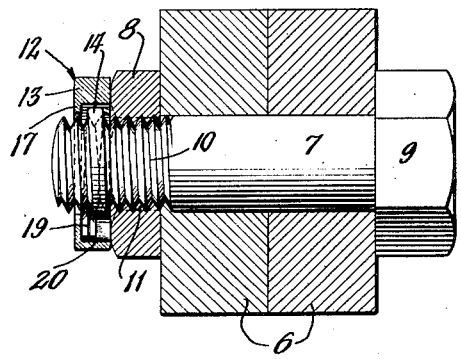
*Fig. 3.*    *Fig. 2.*    *Fig. 4.*
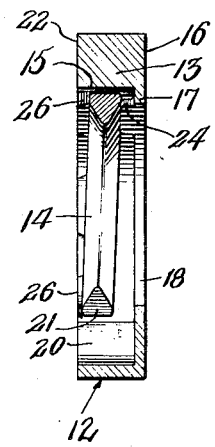 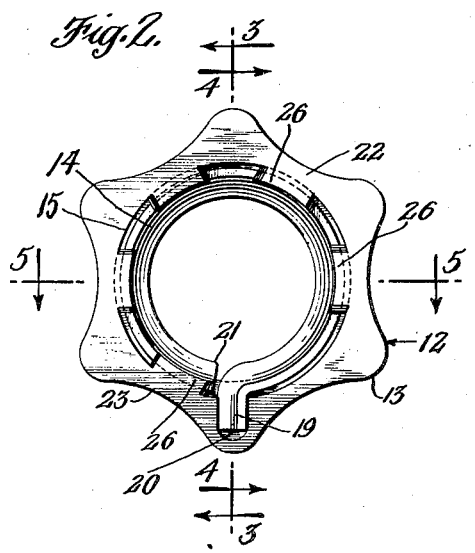 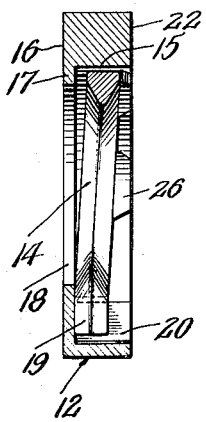
*Fig. 5.*
INVENTORS
Albert Hall
Wilson T. Young
BY
ATTORNEYS Patented Sept. 6, 1938

2,128,938

UNITED STATES PATENT OFFICE 2,128,938

LOCK WASHER

Albert Hall, Narberth, and Wilson T. Young, Oakmont, Pa., assignors to James H. Gravell, Elkins Park, Pa.

Application January 30, 1937, Serial No. 123,094

2 Claims. (Cl. 151—14)

This invention relates to improved means for locking a nut or similar internally threaded member on a bolt, stud or similar externally threaded member.

The principal object of the invention is to provide an extremely simple and relatively inexpensive lock washer which can be applied to the bolt after the nut has been applied thereto.

Another object of the invention is to provide a device of the character described which can be removed with the same wrench or tool that is employed in removing the nut.

Still another object of the invention is to provide a lock washer, as described, which will tend to follow the nut to tighten the same should any wear or looseness develop during service.

A further object of the invention is to provide a lock washer of the character described in which the locking member itself provides a thread for applying the device to the bolt.

Still another object of the invention is to provide a lock washer of the character described which is readily adaptable to any variation in adjustment which may be required and which can be applied without special knowledge or tools as well as one which can be removed and used repeatedly without injuring the washer itself, the nut, or the bolt.

Another important object of the invention is to provide a locking device which will present a flat contacting face to the nut.

The foregoing together with such other objects as may appear hereinafter or are incident to our invention are obtained by means of a construction which is illustrated in preferred form in accompanying drawing, wherein:

Figure 1 is a longitudinal section illustrating a nut and bolt connection to which our improved lock washer has been applied;

Figure 2 is a plan view of the face of our improved lock washer which is applied against the back of the nut;

Figure 3 is a section on the line 3—3 of Figure 2;

Figure 4 is a section on the line 4—4 of Figure 2; and

Figure 5 is a section on the line 5—5 of Figure 2.

In the following description as well as in the claims we wish it to be understood that the term "bolt" is intended to be understood as applying to any similar male threaded element and the term "nut" to any similar female threaded element.

In Figure 1 we have shown two members 6 secured together by means of the bolt 7 and nut 8, the bolt being provided with a head 9 and the threads 10, and the nut, of course, being internally threaded as at 11. Applied to the outer face of the nut, as shown, is our improved lock washer indicated as a whole by the reference character 12 the details of which will now be described.

It consists primarily of a housing 13 and a locking band 14. The housing is provided with an interior recess 15 in which the band 14 is mounted. The outer face 16 of the housing, i. e. the face away from the nut when the device is in locking position, presents an interior flange 17 toward the bolt with the opening 18 defined thereby of slightly greater dimension than the outside dimension of the bolt threads.

The band 14 is a split spiral member preferably of triangular cross section, as shown, and composed of a single turn, the spiral corresponding to the pitch of the threads on the nut and on the bolt. The inside of the band is of a diameter such as to adapt it to be threaded on the bolt. The outside diameter of the band is slightly less than the inside diameter of the recess 15 so that the band is free to float slightly transversely of the axis of the bolt opening.

The following end 19 of the band is turned outwardly at an angle and is adapted to project into a recess or pocket 20 in the housing, the leading end 21 being brought around substantially to a point approximately under the end 19. By the expression "following end" of the band, we mean the end of the band which is away from the nut when the locking device is placed in position on the bolt. This is clearly shown in Figure 1. The other or free end 21 of the band, therefore, will be considered as the leading end because this is the end which first enters the threads on the bolt.

The inner face 22 of the housing presents a flat face against the nut 8 so that uniform and snug contact is made between the nut and the lock washer.

The perimeter of the lock washer may be of any desired shape. In the present instance we have shown it of hexagon shape to correspond with the customary hexagon nuts but the faces of each of the six sides of the hexagon are scalloped as at 23 in order to provide a convenient grip for the fingers so that the device may be readily applied to the bolt. This, of course, is not material to the invention and it will be understood that the washer may be made of any desired shape.

We prefer to provide suitable means for holding the spiral band in its proper threading position and to this end we provide a lug 24 at a point substantially opposite to the end 19 which lug projects inwardly sufficiently far so that the band will be held in its true spiral position when it abuts thereagainst with the end 19 substantially flush with the inside of the outer face 22.

After the band has been inserted in the housing we may then provide one or more inwardly projecting positioning lugs 26 which are of progressively greater thickness axially of the bolt opening from the end 21 of the band to the end 19, the progression in thickness corresponding, of course, to the pitch of the spiral.

In this way the band may be held in its proper threading position in the housing although free to move slightly transversely of the axis of the bolt opening as already mentioned.

The operation of the device is as follows. After the parts are bolted together and the nut 8 applied our improved lock washer is applied to the outside of the nut, the band 14 acting as an internal thread corresponding in pitch to the threads on the nut and on the bolt. The end 19 which engages in the recess 20, during advancing movement of the lock washer, will have a tendency to slightly expand the band so that the device can readily be screwed down. Reverse movement, i. e. unscrewing movement, will cause the band to contract and tightly grip the bolt and thereby prevent the nut from coming off.

It will be obvious that the device is exceedingly simple and inexpensive to manufacture, that it can be quickly applied at the back of any nut and that it may be readily removed by means of the same tool with which the nut is removed although the grip of the band is sufficiently great to prevent such removal except upon the application of far more force than is ever met with under normal loosening movements. Indeed, if looseness or wear in the joined parts develops the tendency is for the nut and the lock washer to advance more tightly upon the bolt because the only way in which vibration can act to move the nut and the washer is in a direction to tighten the parts rather than to loosen them.

If removed with a suitable wrench the lock washer may be reused and the process of removal and reuse entails no damage either to the lock washer itself or to the bolt or nut or the threads on either.

Furthermore the use of our improved locking device prevents damage to the members which are joined together such as often occurs where the ordinary types of lock washer are applied between the inner face of the nut and the face of the abutting member against which the nut takes. In addition the flat face between the outside of the nut and the inside of the lock washer also prevents injury to either part and insures a firm seat of the locking device upon the nut.

Other advantages will appear to those skilled in the art.

What we claim is:

1. A follower for locking a nut on a bolt, comprising a housing having a central aperture of greater dimension than the diameter of the bolt, a split spiral band carried in said housing and adapted to thread onto the bolt, said band being normally free to float slightly transversely of said housing, interengaging means between the housing and the following end of the band, and band retaining means projecting from the wall of the recess.

2. A lock washer to follow the nut on a bolt, said washer presenting a flat contacting face toward the nut and being formed with a recess surrounding the bolt opening, a split spiral band in the recess adapted to thread onto the bolt, said band being normally free to float slightly transversely of the axis of the bolt opening, and interengaging means between the following end of the band and the washer, said recess being provided with projecting means for holding the band in threading position.

ALBERT HALL.
WILSON T. YOUNG.